United States Patent
Ramos et al.

(10) Patent No.: US 10,948,461 B2
(45) Date of Patent: Mar. 16, 2021

(54) INVERTED WICK TYPE TEMPERATURE CONTROL SYSTEM

(71) Applicants: Enrique Gadea Ramos, Boynton Beach, FL (US); Martin Alexander Thomas, Boynton Beach, FL (US)

(72) Inventors: Enrique Gadea Ramos, Boynton Beach, FL (US); Martin Alexander Thomas, Boynton Beach, FL (US)

(73) Assignee: Anton Paar Quantatec, Inc., Boynton Beach, FL (US)

( * ) Notice: Subject to any disclaimer, the term of this patent is extended or adjusted under 35 U.S.C. 154(b) by 194 days.

(21) Appl. No.: 16/263,834

(22) Filed: Jan. 31, 2019

(65) Prior Publication Data
US 2020/0249209 A1    Aug. 6, 2020

(51) Int. Cl.
*G01N 30/12*    (2006.01)
*G01N 30/30*    (2006.01)
*G01N 30/60*    (2006.01)

(52) U.S. Cl.
CPC .......... *G01N 30/12* (2013.01); *G01N 30/30* (2013.01); *G01N 30/6047* (2013.01); *G01N 30/6078* (2013.01); *G01N 2030/122* (2013.01); *G01N 2030/3023* (2013.01)

(58) Field of Classification Search
CPC .. G01N 15/08; G01N 15/0806; G01N 15/088; G01N 2015/0866; G01N 2030/122; G01N 2030/3023; G01N 30/12; G01N 30/30; G01N 30/6047; G01N 30/6078; B01L 7/50
See application file for complete search history.

(56) References Cited

U.S. PATENT DOCUMENTS

| | | | |
|---|---|---|---|
| 3,555,912 A | 1/1971 | Lowell | |
| 3,850,040 A | 11/1974 | Orr | |
| 4,693,124 A * | 9/1987 | Killip | B01L 7/00 62/373 |
| 5,058,442 A | 10/1991 | Yamanaka | |
| 5,646,355 A | 7/1997 | Wenman et al. | |
| 6,387,704 B1 * | 5/2002 | Thomas | G01N 15/0893 436/43 |
| 2008/0299648 A1 * | 12/2008 | Tomer | C12Q 1/04 435/287.7 |
| 2017/0128935 A1 * | 5/2017 | Roscoe | B01L 3/5029 |

FOREIGN PATENT DOCUMENTS

| | | |
|---|---|---|
| ES | 2561707 | 12/2015 |
| WO | WO2017109246 | 6/2017 |

* cited by examiner

*Primary Examiner* — Francis C Gray
(74) *Attorney, Agent, or Firm* — Robert M. Schwartz; Alfred A. Dassler

(57) ABSTRACT

A sample vessel assembly to carry out a sorption analysis in a container provided with a cooling liquid. The sample vessel assembly includes a sample vessel configured to be suspended within the container. The sample vessel has a sample holding region at a sample end of the vessel to hold a sample to be analyzed. A wick is disposed on the sample vessel and surrounds the sample holding region. The wick extends from the sample holding region to project toward a bottom of the container and draw the cooling liquid over the sample holding region when the sample vessel is disposed in an analysis position in the container.

20 Claims, 7 Drawing Sheets

INVERTED WICK TYPE TEMPERATURE CONTROL SYSTEM

BACKGROUND OF THE INVENTION

Field of the Invention

Temperature Controlling Apparatus for Use with Adsorption Analyzers.

Description of the Related Art

Adsorption analyses are used to characterize the porosity and the surface area of solid materials. In a typical analysis, the solid to be analyzed is cooled down to a cryogenic temperature.

The invention is related to the field of pore size determination and specific surface determination by the gas sorption method. In this method, a vessel containing a sample is immersed in a Dewar filled with a cooling liquid at cryogenic temperature, e.g. liquid nitrogen, in order to keep the temperature of the interior of the sample vessel low and constant during the sorption procedure. Any temperature variation would cause pressure variation, leading to errors in the determination of the amount of gas being adsorbed.

Although different techniques can be utilized to control the sample temperature, the most common practice is to introduce the sample in a glass cell and immerse the part of the cell that holds the sample in a cryogenic liquid (liquid nitrogen or liquid argon for example) and connect the cell to an apparatus that doses known amounts of gas into the cell and follows the pressure of the system. Since the volumes, temperatures and pressures in the system are known the amount of gas that interacted with the sample can be calculated by the use of a Real Gas Law.

When the cell that contains the sample is immersed in the cryogenic fluid a fraction of its volume is cooled down to the analysis temperature (cold volume) while another fraction of the cell remains at room temperature (warm volume). In order to accurately calculate the adsorbed amounts, these volumes need to be known. These volumes are normally calculated by the use of a non-adsorbing gas (commonly helium), which is used for performing a measurement before the adsorption analysis is started or after it is finished.

Nevertheless, these volumes need to be constant during the whole adsorption analysis (or the variation of them during the adsorption analysis needs to be known) in order to accurately calculate the adsorption. However, since cryogenic fluids evaporate, the part of the cell that is immersed in the cryogenic fluid changes with time, changing the cold volume/warm volume fraction over time.

To overcome this challenge, different solutions have been developed and implemented by different adsorption instrument manufacturers.

One possibility known in the art to maintain constant volumes is to keep the cryogenic fluid level constant with respect to the sample cell by changing the position of the cryogenic liquid holder. This arrangement uses a cryogenic level probe and a motorized system that moves the cryogenic liquid holder (Dewar) up at the same rate that the fluid evaporates. The benefit of this system is that the part of the sample cell that is immersed in the cryogenic fluid can be kept to a minimum, assuring that the sample is at the cryogenic fluid temperature. The smaller the fraction of the sample cell volume at cryogenic temperature, the better the accuracy of the adsorption measurement (see the calculation of the effect of the cold volume on the adsorption uptake accuracy below). The disadvantage of this system is that because the Dewar is moving up with time, the temperature gradient in the part of the sample cell that is not immersed in the cryogenic fluid changes with time, needing additional corrections. This temperature control system is disclosed e.g. in U.S. Pat. No. 6,387,704.

A second possibility known in the art to maintain constant volumes within a sample cell immersed in a cryogenic liquid is by surrounding a portion of the sample cell, extending above the surface of the liquid, with a wick. Such an arrangement is disclosed in U.S. Pat. No. 4,693,124 to Killip et al. With this configuration, the fraction of the sample cell volume that is cooled to the cryogenic fluid temperature is constant even though the level of the cryogenic fluid with respect to the sample cell is decreasing by evaporation. This is because the wicking material locally raises the level of the cryogenic fluid to the upper end of the wick and towards the upper end of the sample cell. The disadvantage of this system is that the fraction of the sample cell volume that is kept at cryogenic temperature is necessarily bigger than the one obtained by the previous arrangement.

In a third method known in the art, the level of the cryogenic fluid is not controlled but the change of the cold volume/warm volume fraction is calculated continuously. To do so, an empty cell similar to the cell that holds the sample is added to the system. The empty cell is filled with a non-condensing gas and the pressure changes due to the cryogenic fluid evaporation are followed and used to correct the cold volume/warm volume fraction change in the sample cell. The benefit of this method is that there is no need to for a tight control of the cryogenic fluid level. The disadvantages are that it needs extra hardware (cell, pressure transducer, electronics . . . ) making it a more expensive system and the fact that the cold volumes obtained are very large, which the inventors find, is not desirable for accurate adsorption analysis. The above method is utilized in the instruments commercialized by MicrotracBEL Corp., a subsidiary of NIKKISO CO., LTD. 8-2-52 Nanko-Higashi, Suminoe-ku, Osaka 559-0031, Japan.

There are other approaches in the literature (See WO 2017109246, Ramos et al.) to keep the level of the cryogenic liquid constant by using a pump installed inside the Dewar that circulates the fluid to a higher level or other approaches based on the replenishment of the cryogenic fluid at the same rate that it is evaporating.

SUMMARY OF INVENTION

It is accordingly an object of the invention to provide a device for holding a constant temperature within a sample cell while the fraction of the sample cell volume that is at cryogenic liquid temperature is kept to a minimum. The device for holding a constant temperature in the sample cell overcomes the above-mentioned disadvantages of the heretofore-known devices and methods of this general type and improves the resolution of the adsorption measurement.

The invention proposes an apparatus for maintaining a constant temperature within a vessel wherein the vessel is isolated from direct immersion in a liquid of sub ambient temperature. The apparatus has an intermediary component comprised of a material that possesses both a wicking property and an insulating property. The inverted wick encapsulates the sample portion of the sample vessel (cell) and extends down into the cooling liquid. The interior of the inverted wick is porous and permits the translation of the cooling liquid to the vessel and permits the heat transfer from the vessel to the cooling liquid. The exterior of the inverted wick is sealed, ideally with a polymer film that permits the inverted wick to insulate the cooling liquid from external thermal gradients that exist within the Dewar as the cooling liquid level decreases with time due to evaporation and forces the evaporation of the cooling liquid to take place in the top surface of the wick.

The advantage this method provides over prior art such as that found in U.S. Pat. No. 4,693,124 is that it increases the accuracy of the analyses performed with scientific sorption analyzers, in which the gas pressure measured within the vessel is used to calculate physical properties of material through the use of gas laws (commonly stated as PV=nRTZ), by minimizing the volume of the vessel that is kept at cryogenic temperature. Minimizing the "cold-volume" utilized in this type of analysis implies that any interaction between the analysis gas and the sample have a larger impact on the pressure in the vessel and thus, the sensitivity of the analyzers is enhanced.

An adsorption analysis is performed by dosing adsorbate gas from the manifold to the sample cell, which was previously evacuated. The adsorbed amount can be calculated from the formula:

$$n_{ads}^i = \Sigma n_{dose}^i - \frac{P^i V_{cell} x}{RT_A Z_{cold}^i} - \frac{P^i V_{cell}(1-x)}{RT_R Z_{warm}^i}$$

Where, $n_{ads}^i$: mol adsorbed after i doses from the manifold
$n_{dose}^i$: mol dosed from the manifold to the sample cell in step i
$P^i$: Pressure in the sample cell after dose i
$V_{cell}$: Sample cell volume
x: Fraction of the sample cell at analysis temperature
$T_A$: Analysis temperature (K)
$T_R$: Room temperature (K)
$Z_{cold}^i$: Compressibility factor for the adsorbate at analysis temperature and pressure $P^i$
$Z_{warm}^i$: Compressibility factor for the adsorbate at room temperature and pressure $P^i$ For simplification, an ideal behavior of the gas can be assumed, so:

$$Z_{cold}^i = Z_{warm}^i = 1$$

In order to calculate the error associated with the accuracy of the pressure transducer in the cell, a partial derivative of the adsorbed uptake with respect to the measured pressure is performed:

$$\frac{\delta n_{ads}^i}{\delta P} = -\frac{V_{cell}}{R}\left(\frac{x}{T_A} + \frac{1-x}{T_R}\right)$$

Assuming that the instrument is in a room at 25° C. and the cooling liquid is liquid nitrogen at −196° C.:

$$T_A \approx 77\ K, T_R \approx 298\ K \rightarrow T_R \approx 3.87 T_A$$

$$\frac{\delta n_{ads}^i}{\delta P} \approx -\frac{V_{cell}}{R}\left(\frac{3.87x}{3.87T_A} + \frac{1-x}{3.87T_A}\right)$$

And simplifying:

$$\frac{\delta n_{ads}^i}{\delta P} \approx -\frac{V_{cell}}{3.87 RT_A}(1 + 2.87x)$$

From this formula, it is easy to see that for a fixed cell volume, the smaller the fraction of the sample cell at analysis temperature (x), the smaller the error in the calculated adsorbed uptake associated with the pressure transducer accuracy.

With the foregoing and other objects in view there is provided a sample vessel assembly to carry out a sorption analysis in a container provided with a cooling liquid. The sample vessel assembly includes a sample vessel configured to be suspended within the container. The sample vessel has a sample holding region at a sample end of the vessel to hold a sample to be analyzed. A wick is disposed on the sample vessel and surrounds the sample holding region. The wick extends from the sample holding region to project toward a bottom of the container and draw the cooling liquid over the sample holding region when the sample vessel is disposed in an analysis position in the container.

In accordance with another feature of the invention, the wick includes a wick base and a wick lid that engages the wick base. The wick base and the wick lid define a cavity there between. The cavity is dimensioned for receiving the sample holding region therein.

In accordance with a further feature of the invention, the sample vessel has a stem for insertion of a sample into the sample vessel and the wick lid has an aperture formed therein to receive the stem and allow the lid to be slid along the stem to the wick base.

In accordance with a further feature of the invention, the sample vessel has a stem with a straight wall and the sample holding region has a bulbous shaped portion defined by an expanded diameter relative to the stem.

In accordance with an added feature of the invention, the wick base has the cavity formed therein. The cavity has a height dimensioned to receive the bulbous shaped portion and the wick lid therein.

In accordance with an additional feature of the invention the wick lid has the cavity formed therein. The wick base has an outer surface with a step that defines a shoulder. The wick lid has an end abutting the shoulder when the wick lid is disposed on the wick base.

In accordance with another mode of the invention, the sample vessel is a substantially straight-walled sample vessel and the wick is a cylindrical wick with a cavity for receiving the sample vessel.

In accordance with a further mode of the invention there is provided a stop to establish a position of an end of the wick at an upper limit of the sample holding region when the wick is placed onto the sample vessel.

In accordance with an additional mode of the invention, the stop is defined by a marking provided on the sample vessel, the marking indicates an alignment position of the wick.

In accordance with yet another feature of the invention, the stop is a mechanical stop defined by an indentation in the sample vessel and a pin in the wick that engages the indentation to set the wick at the upper limit when placed on the sample vessel In accordance with yet a further feature of the invention, stop includes a protuberance on the sample vessel and a top edge of the wick engages the protuberance to set the wick at the upper limit when placed on the sample vessel.

In accordance with yet an added feature of the invention, the wick has a blind hole with a depth that defines the stop by engagement with the sample end when the wick is placed onto the sample vessel.

In accordance with yet still an added feature of the invention, the wick is disposed on the sample vessel at a position so that an end thereof begins at a top of the sample holding region to define a cold volume that corresponds substantially with the sample holding region.

In accordance with yet still a further feature of the invention, the wick is covered by an insulation material.

With the objects of the invention in view, there is also provided a wick assembly for a sample vessel having a sample holding region with a sample undergoing a sorption analysis. The assembly includes a wick base and a wick lid that engages the wick base. The wick base and the wick lid define a cavity there between. The cavity is dimensioned to receive the sample holding region therein.

In accordance with an additional further mode of the invention the wick lid has an aperture formed therein to receive a stem of the sample vessel and allow the lid to be slid along the stem to the wick base.

In accordance with yet an additional feature of the invention, the wick base has the cavity formed therein. The cavity has an inside diameter for receiving an outside diameter of the wick lid.

In accordance with still another feature of the invention, the wick lid has the cavity formed therein. The wick base has an outer surface with a step defining a shoulder. The wick lid has an end that abuts the shoulder when the wick lid is disposed on the wick base.

With the objects of the invention in view, there is also provided a method for carrying out a sorption analysis. The method includes to provide a sample vessel with a sample holding region at an end of the vessel. A wick is disposed on the sample vessel over the sample holding region. The wick projects from the end of the vessel away from the vessel.

In accordance with yet a further mode of the invention, the method includes to provide a container with a cooling liquid filled to a level. The sample vessel with the wick is placed into the container into a position in which the wick is directed towards a bottom of the container with an end thereof below the level of the cooling liquid.

Other features which are considered as characteristic for the invention are set forth in the appended claims.

Although the invention is illustrated and described herein as embodied in the device for holding a constant temperature within a sample cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF INVENTION

Figure 1:
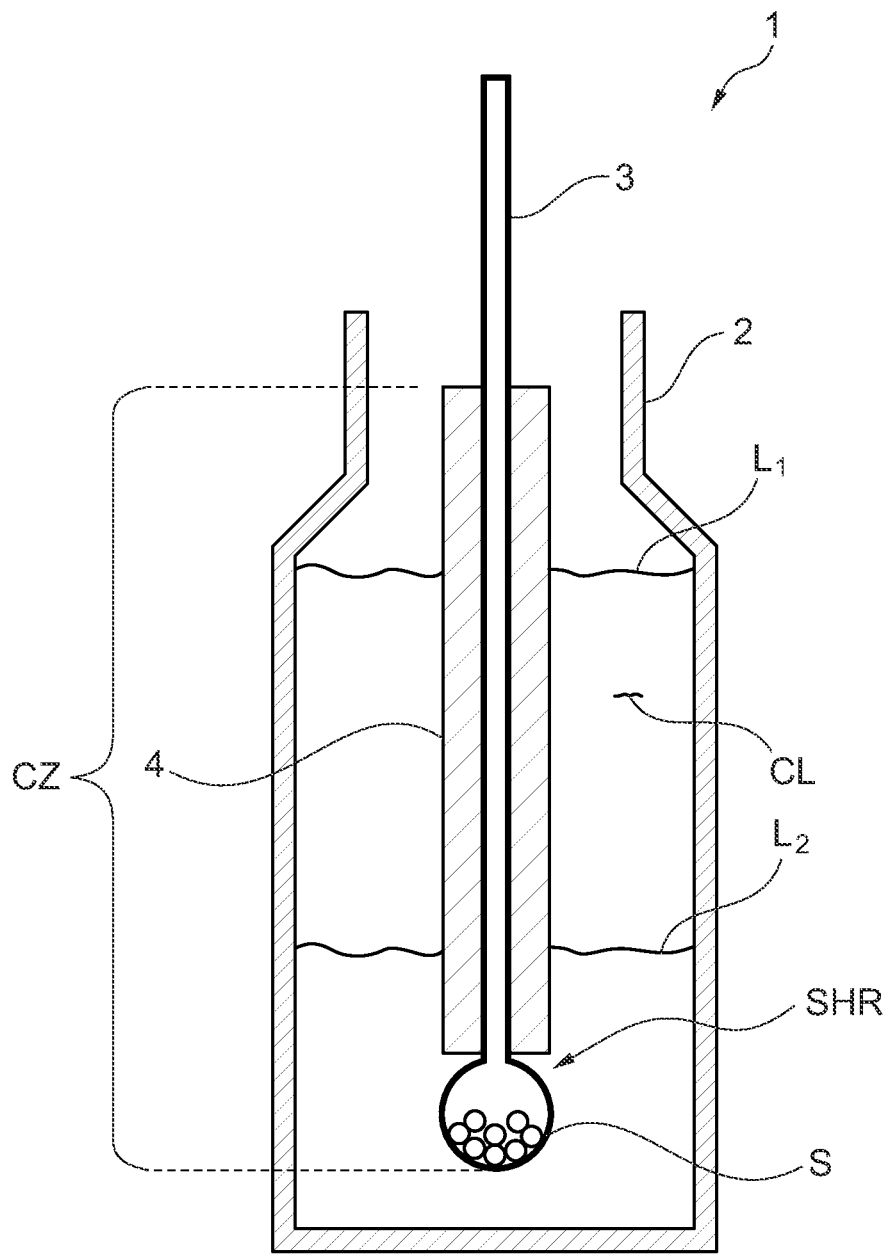
FIG. 1 is a section view of a Prior Art apparatus having a wick that extends along a sample vessel above a liquid level in the Dewar flask.

FIG. 1 shows an apparatus 1 as disclosed in Killip et al. Here, a container provided as a Dewar flask 2 is provided and is filled to a level $L_1$ with an evaporating cooling liquid CL such as liquid nitrogen. Over time of the analysis it is seen that the cooling liquid CL level drops to a lower level $L_2$. A sample vessel 3 is provided for holding the sample S therein at a sample holding region SHR at the base of the sample vessel 3. The sample vessel 3 has a wick 4 that is disposed on the sample vessel 3. As seen in FIG. 1, the wick 4 begins at a position above the sample holding region SHR and extends upward therefrom to a height that is above the level $L_1$ of the cooling liquid CL. The sample holding region SHR is disposed at the bottom of the flask 2 and is exposed directly to the cooling liquid CL. While the cooling liquid CL evaporates, the wick 4 draws cooling liquid CL up the wick 4 and maintains a long cold zone CZ over the length of the wick 4 and the portion of the sample vessel 3 extending from the wick 4 that is submerged in the cooling liquid CL. The construction according to Killip et al. allows the long cold zone CZ to be maintained as the level of the cooling liquid CL drops over a length of the wick. However, in Killip et al. the sample holding region SHR of the sample vessel 3 is always submerged in the cooling liquid CL during a sample analysis.

Figures 2A, 2B:
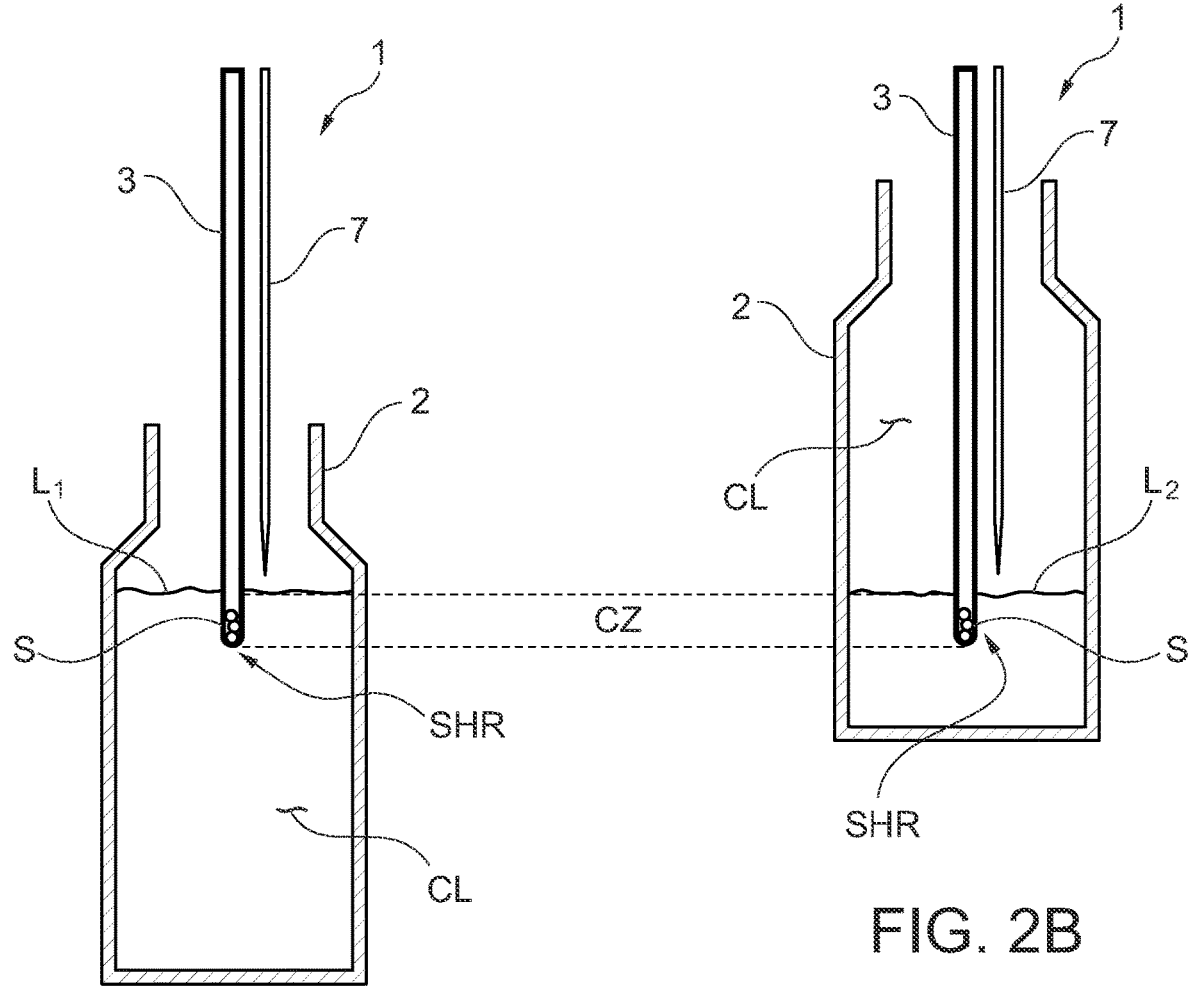
FIGS. 2A and 2B are section views of a Prior Art apparatus accordingly to which a level of a Dewar flask is controlled to maintain the cold zone.

FIGS. 2A and 2B show an alternative apparatus 1 for maintaining a short cold zone CZ (over the length of the sample holding region) while accommodating the evaporation of cooling liquid CL. Particularly, FIG. 2A shows the Dewar flask 2 in a position at the beginning of a sample analysis. The apparatus 1 includes a probe 7 that is in contact with the surface of the cooling liquid CL. The height position of the Dewar flask 2 is set by a displaceable elevator (not shown) on which the Dewar flask 2 is placed. The elevator is constructed to be controlled by the readings of the probe 7 and a corresponding electronic circuit. In this regard, the elevator is raised to maintain contact of the cooling liquid CL with the probe 7. This in turn provides an attempt to maintain the level of the cooling liquid CL at a constant position with respect to the sample vessel 3, to try to maintain the cold zone CZ at a constant temperature with a constant cold volume. FIG. 2B shows a point in time in the analysis after the cooling liquid CL level has dropped to a level $L_2$ which is lower than the level $L_1$. Here it is seen that the Dewar flask 2 is raised in elevation and the sample vessel 3 is closer to the bottom of the Dewar flask 2. The apparatus 1 in FIGS. 2A and 2B is limited by the ability of the probe 7 and elevator to react to the dropping level of cooling liquid CL. This however, creates a problem in that the bigger part of the warm volume is inside the Dewar flask, this causes small changes to the average temperature of the warm volume, thus requiring additional corrections. Accordingly, additional computed corrections are required to compensate for the variations. Such corrections require an outlay of additional elements.

In the present invention, a wick 4 is disposed on the sample vessel and surrounds said sample holding region SHR, the wick 4 extends from the sample holding region SHR for projecting toward a bottom of the container 2 and drawing the cooling liquid CL over the sample holding region SHR when the sample vessel 3 is disposed in an analysis position in the container 2. The wick 4 is provided with a cavity 4c for receiving the sample holding region SHR of the sample vessel 3.

The wick 4 may be a plastic that performs well at cryogenic temperatures such as ultra high molecular weight polyethylene with a porosity with an average diameter of 10 micrometers, but other materials will also work. The important characteristic is the porosity of the material, which should preferably have an average diameter between 1 and 50 micrometers.

Figures 3, 4:
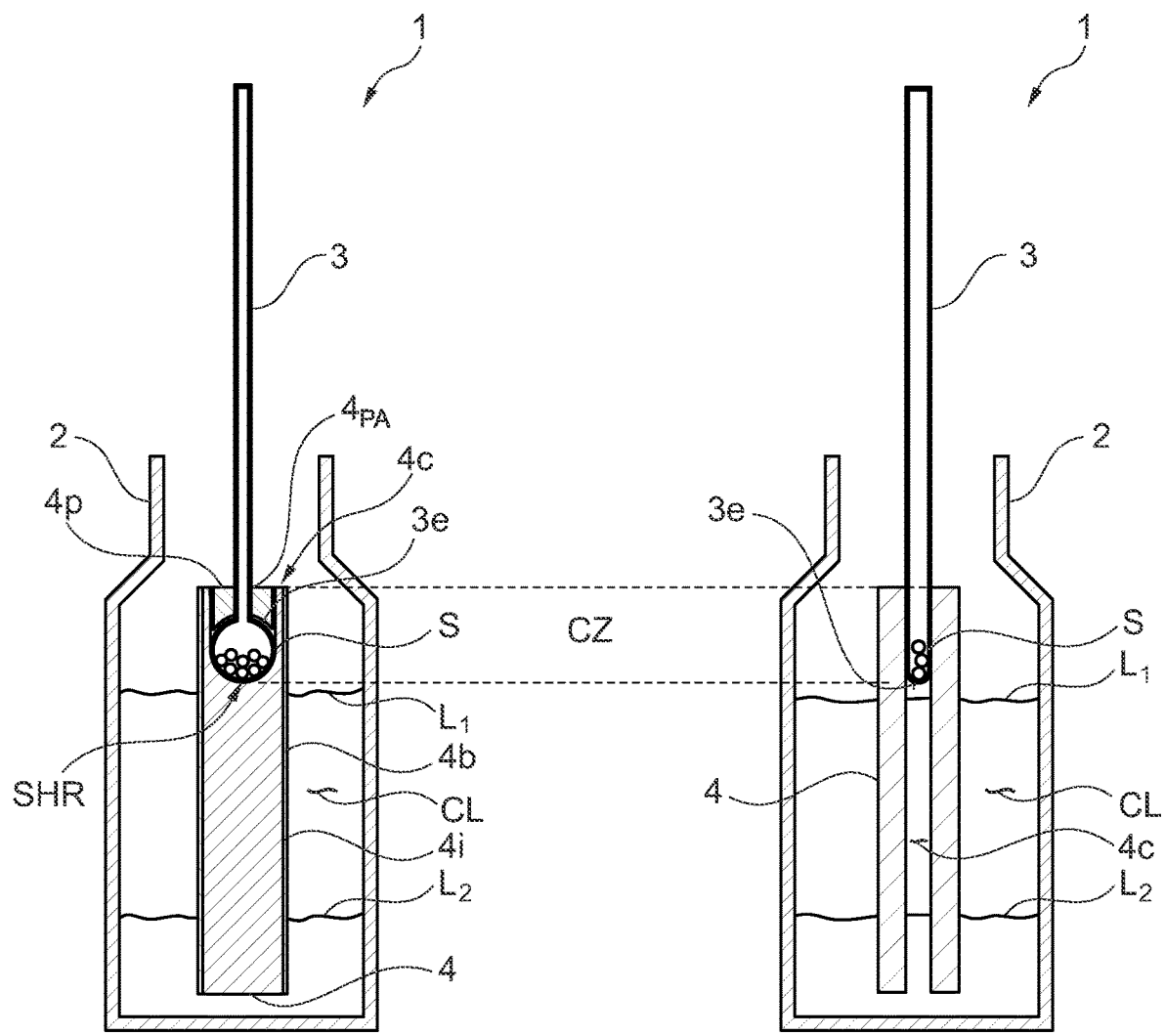
FIG. 3 is a section view of an embodiment according to the invention having a substantially solid wick.
FIG. 4 is a section view of an embodiment according to the invention having a tubular wick.

FIG. 3 shows a first embodiment of the apparatus 1, in which a substantially solid wick base 4b is provided. The wick 4 may be provided with an external insulating layer 4i. As seen in FIG. 3, the Dewar flask 2 is provided with a sample vessel 3 suspended therein. The sample vessel 3 has a straight walled stem 3s that expands into a bulbous sample holding region SHR at a base of the sample vessel 3. It is shown that the cooling liquid CL with the level $L_1$ at the beginning of an analysis and with the level $L_2$ at a subsequent point in time in an analysis after an amount of cooling liquid CL has evaporated. Based upon the construction according to the invention, it is possible for even the level $L_1$ at the beginning of the analysis to be below the sample vessel 3. In FIG. 3, the wick base 4b is solid with the exception of the cavity 4c, which accommodates the sample holding region SHR of the sample vessel 3 therein. A lid or plug 4p is disposed on the stem 3s of the sample vessel 3 and plugs the cavity 4c by mating with an inside diameter of the cavity 4c and encloses the sample holding region SHR from above. The plug 4p is provided with an aperture 4pa for accommodating the stem 3s of the sample vessel 3. The cavity 4c has a height dimensioned to receive the bulbous sample holding region and the plug 4p therein. Accordingly, the sample S contained in the sample holding region SHR is surrounded by the wick 4 and the cold zone CZ corresponds at least to the sample holding region SHR.

Figure 5:
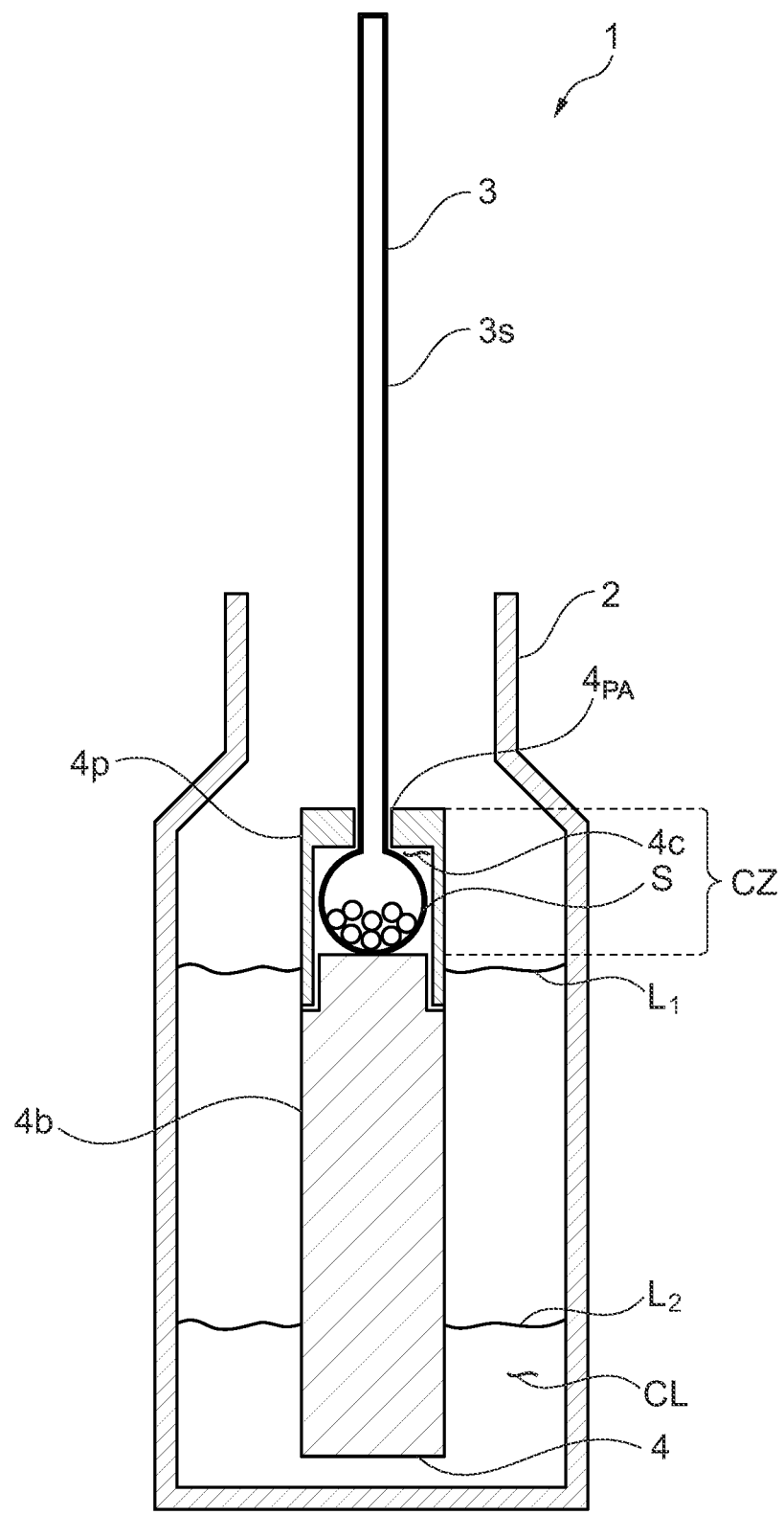
FIG. 5. is a section view of another embodiment according to the invention having a substantially solid wick.

FIG. 5 shows a different embodiment, where the cavity 4c is provided in the lid 4p that is disposed on the stem 3s of the sample vessel 3. Here, the lid 4p has an ID that engages an outside diameter of the wick base 4b. The lid 4p has a shoulder that encloses the sample holding region from above and which defines the aperture 4pa for receiving the stem 3s. The wick base 4b has an outer surface with a step that defines a shoulder, the wick lid 4p has an end abutting the shoulder when the wick lid 4p is disposed on the wick base 4b. In both embodiments, lid/plug 4p has a snug fit for engaging the wick base 4b to allow a user to attach/remove by hand.

Contrary to the Prior Art, the wick 4 of the present invention covers the sample holding region SHR and extends from a sample end 3e of the sample vessel and projects downwardly towards a bottom of the Dewar flask 2 (i.e. an inverted wick). A bottom end of the wick 4 is preferably spaced from the bottom surface of the Dewar flask 2. As the cooling liquid CL level in the Dewar flask 2 decreases due to the evaporation of the cooling liquid CL the wick 4 draws up the cooling liquid CL through capillary action against the force of gravity. This provides for the cooling liquid CL to be maintained around the sample vessel 3 over a length of the wick 4 surrounding the sample vessel 3 and results in a constant temperature over the length of the sample vessel 3 that is surrounded by the wick 4 even with the cooling liquid at a level $L_2$ that is well below the initial level $L_1$ of the cooling liquid CL. In other words, the present invention provides for a constant and small cold volume for the sample holding region SHR. The construction based upon the inverted wick allows for constant temperature to be maintained in the sample holding region SHR of the sample vessel 3, even as the cooling liquid CL decreases due to evaporation. The temperature at the sample holding region SHR is held constant without the need for additional probe(s) and/or mechanisms/circuitry for raising the Dewar flask 2 during evaporation of the cooling liquid CL while keeping the cold volume to a minimum. The construction of the invention also eliminates the need for additional calculated corrections due to the variations in trying to maintain a constant level of immersion of a sample vessel 3 according to the apparatus shown in FIGS. 2A and 2B.

Figure 6A:
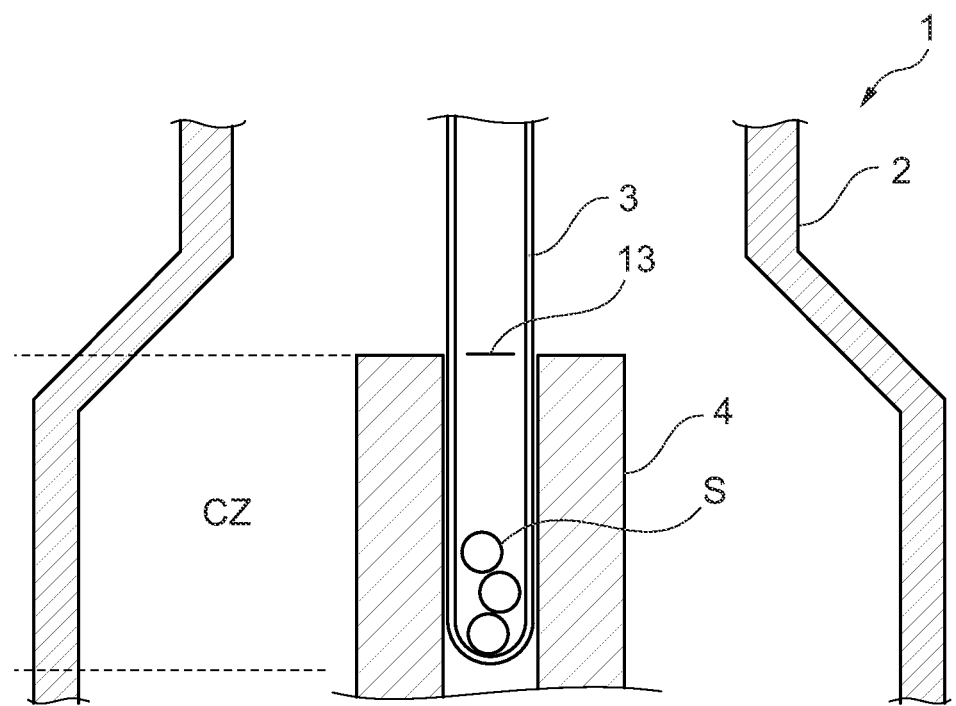
FIG. 6A is an enlarged portion of FIG. 4 showing an embodiment of a stop.
Figure 6B:
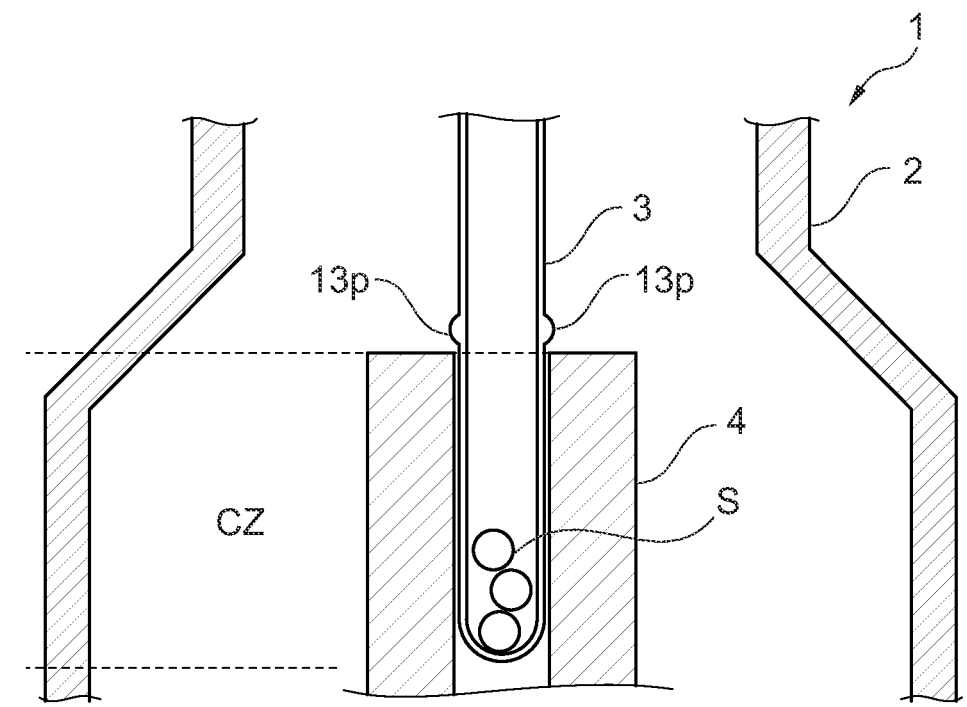
FIG. 6B is an enlarged portion of FIG. 4 showing another embodiment of a stop.

FIG. 4 shows an embodiment in which the cavity 4c of the wick 4 extends through the entire length of the wick 4. Another difference in the embodiment is that the sample vessel 3 has straight sided walls, whereas the sample vessel 3 in FIG. 3, has the bulbous sample holding region. In FIG. 4 the wick is tubular. In FIG. 4, a stop 13 may be provided for establishing a position of an end of the wick at an upper limit of said sample holding region SHR when the wick 4 is placed onto the sample vessel 3. As shown in FIG. 6A, the stop 13 can be defined by a marking 13 provided on the sample vessel 3, the marking 13 indicating an alignment position of the wick 4. Alternatively, as shown in FIG. 6B, it is possible for the stop 13 to be defined by one or more protuberances 13p on the sample vessel 3 against which an end of the wick 4 abuts to set the upper position of the wick 4.

Figure 6C:
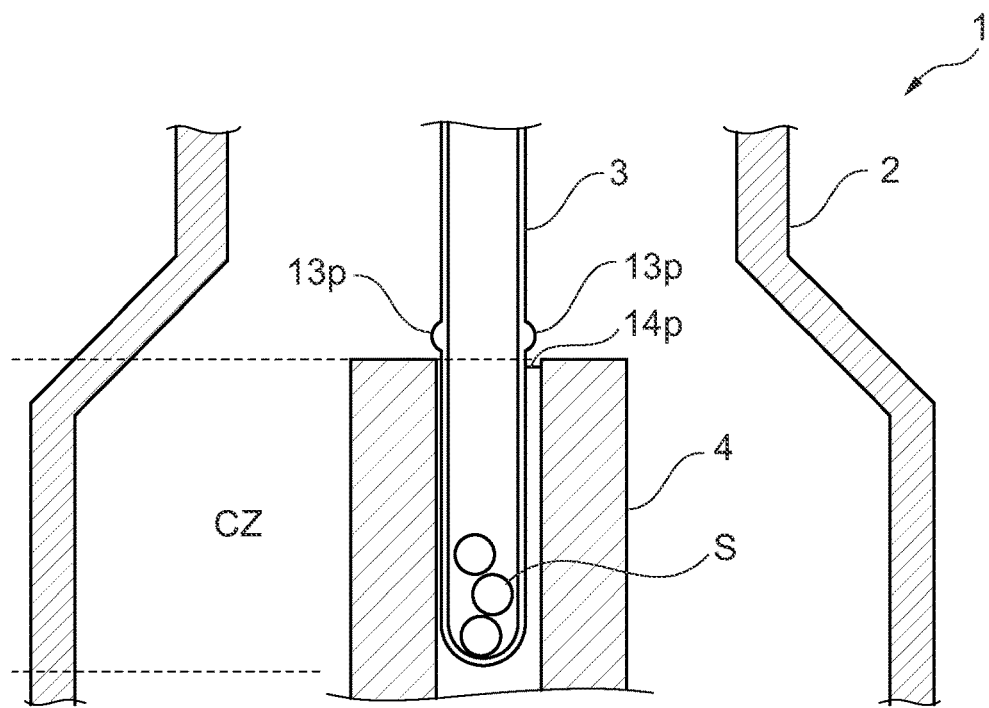
FIG. 6C is an enlarged portion of FIG. 4 showing another embodiment of a stop.
Figure 6D:
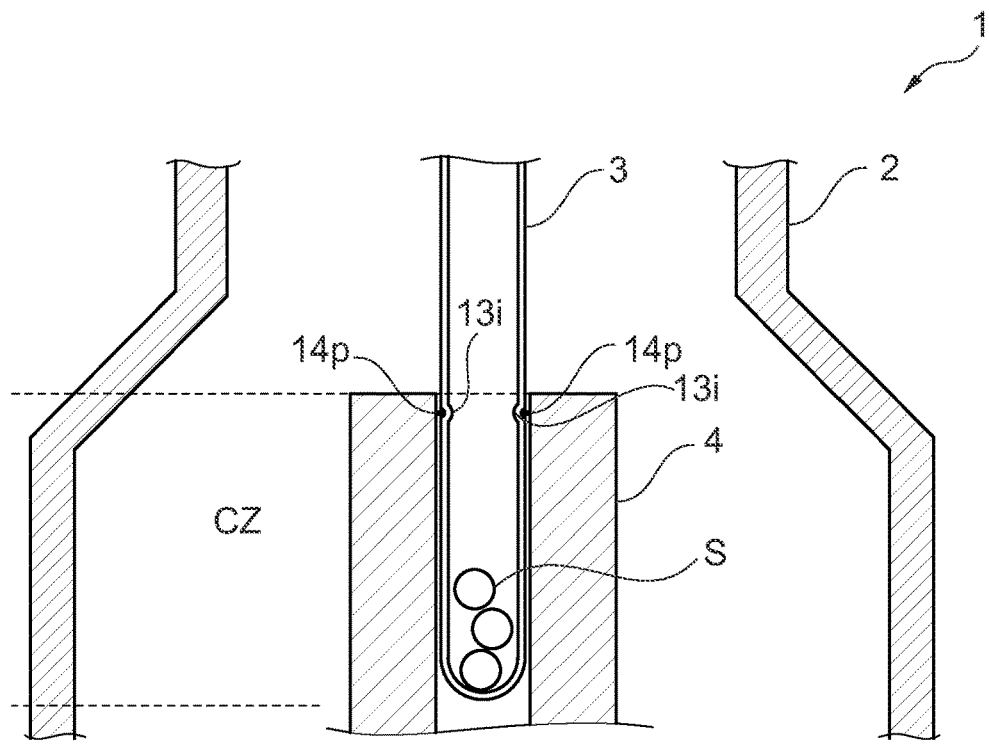
FIG. 6D is an enlarged portion of FIG. 4 showing another embodiment of a stop.
Figure 6E:
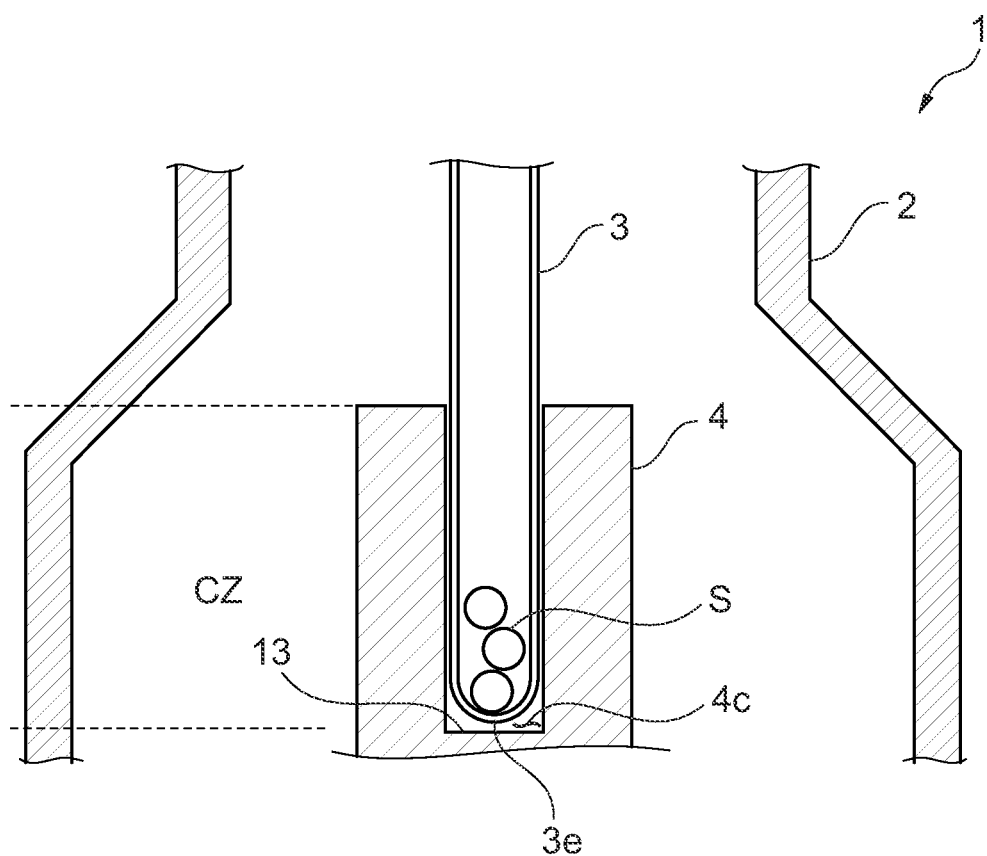
FIG. 6E is an enlarged portion of FIG. 4 showing another embodiment of a stop.

As shown in FIG. 6C a pin 14p is provided in the wick 4 that engages said sample vessel 3 for applying a frictional holding force against the sample vessel 3. Particularly, the pin 14p is embedded in the wick 4 such that the pin 14p constricts the wick 4 at a tangent point thereof to the sample vessel 3 to more firmly affix the wick 4 to the sample vessel 3. As shown in FIG. 6D, the stop 13 can include one or more indentations 13i on the sample vessel 3. Here, the pin 14p is disposed to engage the indentations 13i to set the wick 4 at the upper limit when placed on the sample vessel. As shown in FIG. 6E, it is also possible for the wick 4 to have the cavity 4c as a blind hole with a depth to define the stop 13 by engaging the sample end 3e of the sample vessel 3 when the wick 4 is placed onto the sample vessel 3.

The present invention provides for a method for carrying out a sorption analysis. The method includes providing a sample vessel 3 with a sample holding region SHR at an end of the vessel. A wick 4 is disposed on the sample vessel 3 over the sample holding region SHR. The wick 4 projects from the end of the vessel 3 away from the vessel 3. The method includes providing a container 2 with a cooling liquid CL filled to a level and placing the sample vessel 3 with the wick 4 into the container 2 into a position in which the wick 4 is directed towards a bottom of the container 2 with an end of the wick 4 below the level of the cooling liquid CL.

We claim:

1. A sample vessel assembly for carrying out a sorption analysis in a container provided with a cooling liquid, the sample vessel assembly comprising:
a sample vessel configured to be suspended within the container, the sample vessel having a sample holding region at a sample end of said vessel for holding a sample to be analyzed;
a wick disposed on said sample vessel and surrounding said sample holding region, said wick extending from said sample holding region for projecting toward a bottom of the container and drawing the cooling liquid over said sample holding region when said sample vessel is disposed in an analysis position in the container.

2. The sample vessel assembly according to claim 1, wherein said wick includes a wick base and a wick lid that engages said wick base, said wick base and said wick lid define a cavity there between, said cavity is dimensioned for receiving the sample holding region therein.

3. The sample vessel assembly according to claim 2, wherein said sample vessel has a stem for insertion of a sample into said sample vessel and said wick lid has an aperture formed therein to receive said stem and allow said lid to be slid along said stem to said wick base.

4. The sample vessel assembly according to claim 2, wherein said sample vessel has a stem with a straight wall and said sample holding region has a bulbous shaped portion defined by an expanded diameter relative to said stem.

5. The sample vessel assembly according to claim 4, wherein said wick base has said cavity formed therein, said cavity has a height dimensioned to receive said bulbous shaped portion and said wick lid therein.

6. The sample vessel assembly according to claim 4, wherein said wick lid has said cavity formed therein, said wick base has an outer surface with a step that defines a shoulder, said wick lid has an end abutting said shoulder when said wick lid is disposed on said wick base.

7. The sample vessel assembly according to claim 1, wherein said sample vessel is a substantially straight walled sample vessel and said wick is a cylindrical wick with a cavity for receiving said sample vessel.

8. The sample vessel assembly according to claim 7, further comprising a stop for establishing a position of an end of said wick at an upper limit of said sample holding region when said wick is placed onto said sample vessel.

9. The sample vessel assembly according to claim 8, wherein said stop is defined by a marking provided on said sample vessel, said marking indicating an alignment position of said wick.

10. The sample vessel assembly according to claim 8, wherein said stop is a mechanical stop defined by an indentation in said sample vessel and a pin in said wick that engages said indentation to set said wick at the upper limit when placed on said sample vessel.

11. The sample vessel assembly according to claim 8, wherein said stop includes a protuberance on said sample vessel and a top edge of said wick engages said protuberance to set said wick at the upper limit when placed on said sample vessel.

12. The sample vessel assembly according to claim 8, wherein said wick has a blind hole with a depth that defines said stop by engagement with said sample end when said wick is placed onto said sample vessel.

13. The sample vessel assembly according to claim 1, wherein said wick is disposed on said sample vessel at a position so that an end thereof begins at a top of said sample holding region to define a cold volume that corresponds substantially with said sample holding region.

14. The sample vessel assembly according to claim 1, wherein said wick is covered by an insulation material.

15. A wick assembly for a sample vessel having a sample holding region with a sample undergoing a sorption analysis, the assembly comprising:
a wick base;
a wick lid engaging said wick base, said wick base and said wick lid defining a cavity there between;
said cavity dimensioned for receiving the sample holding region therein.

16. The wick assembly according to claim 15, wherein said wick lid has an aperture formed therein to receive a stem of the sample vessel and allow said lid to be slid along the stem to said wick base.

17. The wick assembly according to claim 15, wherein said wick base has said cavity formed therein, said cavity has an inside diameter for receiving an outside diameter of said wick lid.

18. The wick assembly according to claim 15, wherein said wick lid has said cavity formed therein, said wick base has an outer surface with a step defining a shoulder, said wick lid has an end abutting said shoulder when said wick lid is disposed on said wick base.

19. A method for carrying out a sorption analysis, the method comprising:
providing a sample vessel with a sample holding region at an end of the vessel;
disposing a wick on the sample vessel over the sample holding region, the wick projecting from the end of the vessel away from the vessel.

20. The method according to claim 19, further comprising:
providing a container with a cooling liquid filled to a level;
placing the sample vessel with the wick into the container into a position in which the wick is directed towards a bottom of the container with an end thereof below the level of the cooling liquid.

* * * * *